United States Patent
Bolt et al.

(10) Patent No.: US 7,631,355 B2
(45) Date of Patent: Dec. 8, 2009

(54) SYSTEM AND METHOD FOR IDENTIFYING EXTREME BEHAVIOR IN ELEMENTS OF A NETWORK

(75) Inventors: George Bolt, Hampshire (GB); John Manslow, Hampshire (GB)

(73) Assignee: Cerebrus Solutions Limited, Harlow (GB)

( * ) Notice: Subject to any disclaimer, the term of this patent is extended or adjusted under 35 U.S.C. 154(b) by 455 days.

(21) Appl. No.: 10/965,670

(22) Filed: Oct. 14, 2004

(65) Prior Publication Data

US 2005/0138463 A1  Jun. 23, 2005

Related U.S. Application Data

(63) Continuation of application No. PCT/AU03/00442, filed on Apr. 15, 2003.

(51) Int. Cl.
  *G06F 11/00* (2006.01)
(52) U.S. Cl. .............. 726/23; 726/22; 726/24; 709/223; 709/224; 709/229
(58) Field of Classification Search ............ 726/22–24; 709/223–224, 229; 370/465, 395.64
  See application file for complete search history.

(56) References Cited

U.S. PATENT DOCUMENTS

| | | | |
|---|---|---|---|
| 6,073,089 A | 6/2000 | Baker et al. | |
| 6,148,065 A | 11/2000 | Katz | |
| 6,298,454 B1 | 10/2001 | Schleiss et al. | |
| 6,324,656 B1 | 11/2001 | Gleichauf et al. | |
| 6,473,505 B1 * | 10/2002 | Khuc et al. | 379/265.01 |
| 6,499,059 B1 * | 12/2002 | Banzhaf | 709/229 |
| 6,567,409 B1 * | 5/2003 | Tozaki et al. | 370/395.64 |

* cited by examiner

*Primary Examiner*—Thanhnga B Truong
(74) *Attorney, Agent, or Firm*—Knobbe Martens Olson & Bear LLP

(57) ABSTRACT

A system for identifying extreme behavior in elements of a network comprises a profiler and a collator. The profiler and the collator perform a method of identifying extreme behavior in the network elements. The profiler maintains one or more group profiles of network elements. Each group profile is associated with a plurality of network elements. The profiler accumulates values of a first function of the contents of an input data stream over a first period of time for each group profile. The input data stream includes at least one field containing a network element reference. The accumulated values of each group profile are compared with a corresponding collation threshold. The collator creates a collation instance for each group profile that reaches the collation threshold. Each collation instance creates a plurality of collation profiles. Each collation profile is associated with one or more network elements from the plurality of network elements corresponding to the group profile that caused the creation of the collation instance. The collator instance accumulates values of a second function of the contents of the input data stream for each collation profile over a second period of time. Extreme behavior of network elements is identified from the accumulated values of the collation profiles.

25 Claims, 2 Drawing Sheets

SYSTEM AND METHOD FOR IDENTIFYING EXTREME BEHAVIOR IN ELEMENTS OF A NETWORK

RELATED APPLICATIONS

This application is a continuation application, and claims the benefit under 35 U.S.C. §§120 and 365 of PCT Application No. PCT/AU03/00442, filed on Apr. 15, 2003 and published Oct. 30, 2003, in English, which is hereby incorporated by reference.

BACKGROUND OF INVENTION

1. Field of the Invention

The present invention relates to identifying extreme behavior in elements of a network. Extreme behavior may be generated by a target event which, for example, may be fraudulent use of the network, however the present invention has application in detecting other target events which cause extreme behavior in elements of a network.

2. Description of the Related Technology

Fraud is a serious problem in modern telecommunications systems, and can result in revenue loss by the telecommunications service provider, reduced operational efficiency, and the loss of customers that switch to networks that are perceived to be more secure. In the highly competitive telecommunications sector, any provider that can reduce revenue loss resulting from fraud—either by its prevention or early detection—has a significant advantage over its competitors.

Fraudulent activity is frequently associated with unusual increases in the activity of particular elements in a network. These include switches (which are used to route data around the network), and data sources and sinks (typically individual telephones or modems in the case of telecommunications networks). In most cases, the number of elements in a network is so large that the level of normal activity associated with each cannot be assessed. For example, there are several tens of billions of telephones connected to the global telecommunications network, meaning that impractically large amounts of storage would be required to maintain the statistics necessary to monitor the level of activity associated with each individually. Despite these difficulties, fraud often results in unusually high activity in a frequently small set of network elements, and identifying these elements is important in recognising repeated attacks by individual fraudsters and the weaknesses in the network that they are exploiting. It is believed that there are no techniques known in the prior art that detect fraud by identifying unusual increases in the number of calls to small sets of numbers on the global telecommunications network.

SUMMARY OF CERTAIN ASPECTS OF THE INVENTION

One aspect of the invention provides a system for identifying elements in a network that exhibit unusually high values from a user configurable function of the contents of a data stream associated with them. The present invention has a variety of applications, including, but not limited to, fraud detection and fault monitoring.

Another aspect of the invention provides a method for identifying extreme behavior in elements of a network comprising: maintaining one or more group profiles of network elements, each group profile being associated with a plurality of network elements; accumulating values of a first function of the contents of an input data stream over a first period of time for each group profile, the contents of the data stream including at least one field containing a network element reference; comparing the accumulated values of each group profile with a corresponding collation threshold; creating a collation instance for each group profile that reaches the collation threshold, each collation instance creating a plurality of collation profiles, each collation profile being associated with one or more network elements from the plurality of network elements corresponding to the group profile that caused the creation of the collation instance; accumulating values of a second function of the contents of the input data stream for each collation profile over a second period of time; and identifying extreme behavior of network elements from the accumulated values of the collation profiles.

Still another aspect of the invention provides a system for identifying extreme behavior in elements of a network comprising: a profiler arranged to maintain a plurality of group profiles of network elements, each group profile being associated with a plurality of network elements and comprising accumulated values of a first function of the contents of an input data stream over a first period of time, the input data stream comprising at least one field which contains a network element reference, wherein the profiler is configured to compare the accumulated values of each group profile with a corresponding collation threshold; and a collator for creating collation instances, the collator configured to only create a collation instance when the profiler determines from the comparison of each accumulated value with the corresponding collation threshold that the corresponding collation threshold has been reached, the collation instance creating a collation profile for one or more network elements within the plurality of network elements over a second configurable period of time, each collation profile consisting of accumulated values of a second function of the contents of the input data stream, wherein the collator is configured to identify extreme behavior from the accumulated values of each collation profile.

Preferably the data stream includes an indication of the probability that the element is subject to a target event. Preferably, the target event is fraudulent use of the network.

Preferably each collation threshold is calculated as a configurable function of a configurable number of previous group profiles for the corresponding plurality of network elements.

Preferably the plurality of network elements is a contiguous range of network elements.

Preferably a collation profile is created for each of the network elements in the plurality of network elements that reached the collation threshold. Alternatively a collation profile is created for groups of network elements.

Preferably the first function does not modify the data stream. Alternatively the first function is a fraud risk assessment function.

Preferably the second function is the same as the first function. Alternatively, the second function is a fraud risk assessment function.

Preferably the first period of time is longer than the second period of time. Preferably the first period of time is an integer multiple of a second period of time.

Preferably the collator is configured to sort the collation profiles in descending order at the end of the profiling period of the collation instance. Preferably extreme behavior of the network is identified from the sorted list of collator profiles.

Preferably extreme values of the collator profiles are identified by looking for the first pair of contiguous collation profiles with a difference between them that is larger than the value of the smaller of the two contiguous collation profiles. Preferably an alert is created for the collation profiles which are above the smaller of the pair.

Preferably the collator is configured to delete the collation instances at the end of the second period whereby new collation instances may be created.

Preferably if a collation instance does not identify specific extreme behavior at the end of the collation period an alert for the range is generated.

Preferably alerts generated are investigated. More preferably the alerts generated are investigated to determine whether fraud is the trigger of the alert.

Where an alert is generated, that upon investigation turns out not to be created by a target extreme behavior, the collation threshold of the group profiler corresponding to the collation instance that generated the alert is adjusted by a configurable amount to be less sensitive so that the data that caused the alert(s) to be generated does not cause another false alert.

Preferably the collation threshold may be temporarily adjusted to take into account known abnormal periods.

Preferably specific network elements or network element ranges that are expected to behave erratically may be excluded from the analysis.

BRIEF DESCRIPTION OF THE DRAWINGS

In order to facilitate a better understanding of the nature of the invention, preferred embodiments will now be described in greater detail, by way of example only, with reference to the accompanying drawings in which.

DETAILED DESCRIPTION OF CERTAIN EMBODIMENTS OF THE INVENTION

Figure 1:
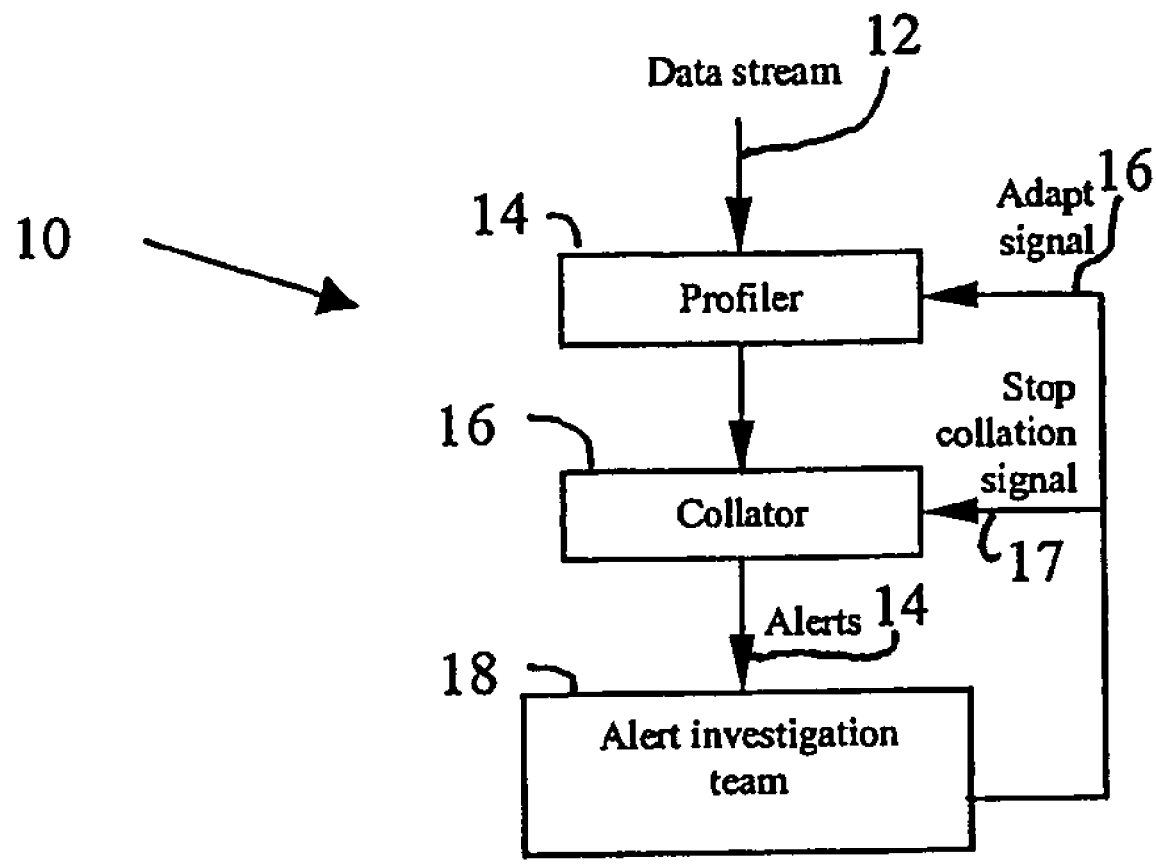
FIG. 1 is schematic representation of a preferred embodiment of a system for identifying extreme behavior in elements of a network according to one embodiment of the invention.

Referring to FIG. 1 there is shown a preferred embodiment of a system 10 configured to identify extreme behavior in elements of a network. The system 10 includes a profiler 14 that receives a data stream 12 and a collator 16, which communicates with the profiler 14.

The system 10 may be implemented in the form of a computer or a network of computers programmed to perform the roles of profiler 14 and collator 16 to process the data stream to identify extreme behavior in elements of the network. For example, a single computer could be programmed to run the profiler 14 and collator 16 components of the system or dedicated computers may be programmed to run each of these components of the system 10.

The profiler 14 maintains profiles for user specific ranges of network elements. These ranges can be specified in both numeric and alphanumeric terms so that ranges of elements with numeric, alphanumeric and alphabetic identifiers can be profiled. For example, if the system was used to monitor the telephone numbers called by subscribers to a particular telecommunications service, one range may include all numbers between 113000000 and 113999999 inclusive, which may correspond to a particular region of the country in which the service is based, while another may include all numbers from 82000000 to 83999999, which could correspond to all calls to mobile phones. Similarly, if the system is being used to monitor the activity of switches in a network (which have alphanumeric identifiers), a typical range would include all switches with identifiers between RFHK04 and RZTI05, where the letters and numbers are assumed to have their normal alphabetic and numeric ordering, the numbers are assumed to, for example, precede the letters, and a left-right precedence is assumed within each string. Switches with identifiers RFHK0A and RFHK05 would therefore lie within the specified range, whereas switches with identifiers RFHK03 and RZTIA0 would not.

Each profile that is created is unique to the allocated range of network elements. The profile includes the values of a function of the contents of the data stream 12 associated with the network elements in each range, accumulated over a user configurable profiling period. The data stream 12 consists of records containing at least two fields, one of which contains an identification of the network element that the record refers to (eg. the element number), and the others contain information that may or may not be used by the profiler, depending on its configuration. The profiling function can be as simple as finding the identity of the network element (which leaves the data unchanged) or as complex as a neural network that could, for example, be trained to extract an indication of the risk that one or more of the elements in the range is subject to fraud. When the system is used for telecommunications fraud detection, it is common to apply no function to the contents of the data stream, because it typically contains information—such as call costs, for example—that can be used to detect fraud in its unprocessed form. By no function is it meant no modification is made to the data.

Over the profiling period, the values of the functions are accumulated to produce profiles of the behavior of each range of network elements. At the end of the period, the contents of each profile is compared to a collation threshold. The collation threshold is calculated as a user configurable function of a user configurable number of previous profiles for the same range of elements. For example, assuming that a profile for a range of elements is generated over a 24 hour period, the resulting profile may be compared to the mean of the previous 14 profiles for the same range of elements. In this case, the collation threshold function calculates the mean and the period is 14 days. The collation threshold function also includes a sensitivity factor, such that the result of the collation threshold is the product of a collation threshold precursor and a sensitivity multiplier. Any range whose profile exceeds the collation threshold is considered to be suspicious. That is, if a range exceeds the collation threshold by a factor greater than the user configurable precursor, it is considered to be suspicious. Each suspicious range of network elements has a collation instance 16 created and assigned to it.

The collator 16 creates collation instances which maintain collation profiles for network elements within each instance's range. A collation instance is created only once a profiler 14 detects unusual changes in a range's profile, i.e. the accumulated data reaches the collation threshold. Preferably, each collation instance creates collation profiles for every network element in the range with which they are associated that is referenced in the data stream 12 over a user configurable collation period. For example, assume that the telephone call destination numbers (i.e. the numbers being called) are profiled in terms of the lengths of the calls made to them, and assume that a collation instance is created for the range of numbers 113000000 to 113000100. If the collation period is 24 hours, and only calls to two unique numbers in the range 113000000 to 113000100 are made in that time, only two collation profiles are created. The collation profiles are usually based on the same functions of the data stream 12 as those of the profiler, though it is sometimes useful to include more complex functions, such as the fraud risk neural network that was mentioned earlier. Because fewer collation instances are usually in simultaneous operation than profilers, more complex and computationally intensive analyses can be performed in the collation instances with less effect on the rate at which the system can process data than is possible in profilers.

When a collation instance reaches the end of its collation period, the collation profiles are sorted in descending order (so that the elements with the highest valued collator profiles lie at the top of the list). The profiles with extreme values are then identified. The preferred method of achieving this is to start at the top of the list and look for the first pair of contiguous profiles where the difference between them is larger than the value of the smaller of the two profiles. This is a heuristic for rapidly identifying the network elements that are individually responsible for a large proportion of the profile accumulated by the profiler, and hence are most likely to have contributed to the increase in the profile that was observed. Alerts are then generated for the profiles which are above the smaller of the two profiles in the ordered list. If a specific set of elements can be identified in this way, alerts are generated for all the elements in the set. The collation instance is then emptied (all collation profiles are deleted) and the collation process repeated until either a specific set of elements cannot be identified at the end of the next collation period, or the collator is instructed to stop that collation instance. The stop instruction may be sent by another service that investigates the cause or has investigated the cause of the extreme behavior.

In a telecommunications network, the stop instruction is usually sent by a team 18 that the network operator commits to the investigation of the alerts generated by the collator, once their cause has been identified. For example, a telecommunications network operator may use a team of fraud analysts to investigate the cause of alerts generated by collation instances, and when the causes have been identified, the collation instances responsible for the alerts would be instructed to stop. If a collation instance is unable to identify a specific set of elements at the end of a collation period, it generates a single alert for the range of elements that it is monitoring, and stops. Once stopped, the collation instance deletes all collation profiles and is then itself deleted by the collator 16.

Occasionally, the system will generate alerts that are found upon investigation not to be of the type of target event being sought, such as a false fraud alert. In these circumstances, it is desirable to instruct the system to adapt via an adapt signal 22 to the data that caused the alerts 24 to be generated, such that if the same data were repeated in future, alerts would not result. When the system receives an adapt signal 22 from the alert investigation team 18, which is associated with a particular collation instance alert, the collation threshold of the profiler associated with the collation instance that generated the alert in increased, by increasing the sensitivity factor so that the collation threshold is set to the value of the profile held by the profiler instance at the time that the collator instance was created, plus an additional user configurable amount of headroom. The headroom is usually specified as a percentage of the new collation threshold and controls the trade-off between the risks of increasing the profilers collation threshold too much (resulting in excessive desensitisation, which could cause important events to be missed by the system), and increasing it too little (resulting in inadequate desensitisation and making more spurious alerts likely in future).

The system can also be configured to temporarily adjust the collation thresholds for periods during which abnormal activity is to be expected. For example, substantial increases in the duration, cost, and frequency of telephone calls is to be expected in most countries at around Christmas time, and may cause alerts if the sensitivity of the system is not reduced. Temporary sensitivity adjustments are specified by the start time and date, and end time and date of the period during which the adjustment will apply, and the percentage change that is to be made to the profilers' collation thresholds. For example, the reduction in sensitivity required for a Christmas period could be specified by the times 00:00:00 21 December, 00:00:00 27 December, and the percentage +20 percent. If the collation sensitivity was 1.0 before this period, it would be set to 1.2 within it, and reset to its original value of 1.0 at its end.

The system allows ranges of network elements to be excluded from analysis by the system altogether. This lets the network operator exclude from analysis network elements that are expected to behave erratically, and hence may generate large numbers of irrelevant alerts. For example, when the system is applied to traffic on a telecommunications network, alerts can be generated by commercial services such as competition lines, which tend to display massive short term increases in activity. The list of ranges of excluded elements can be updated while the system is in operation, allowing the network operator's alert investigation team to add ranges of elements that persistently generate meaningless alerts.

Figure 2:
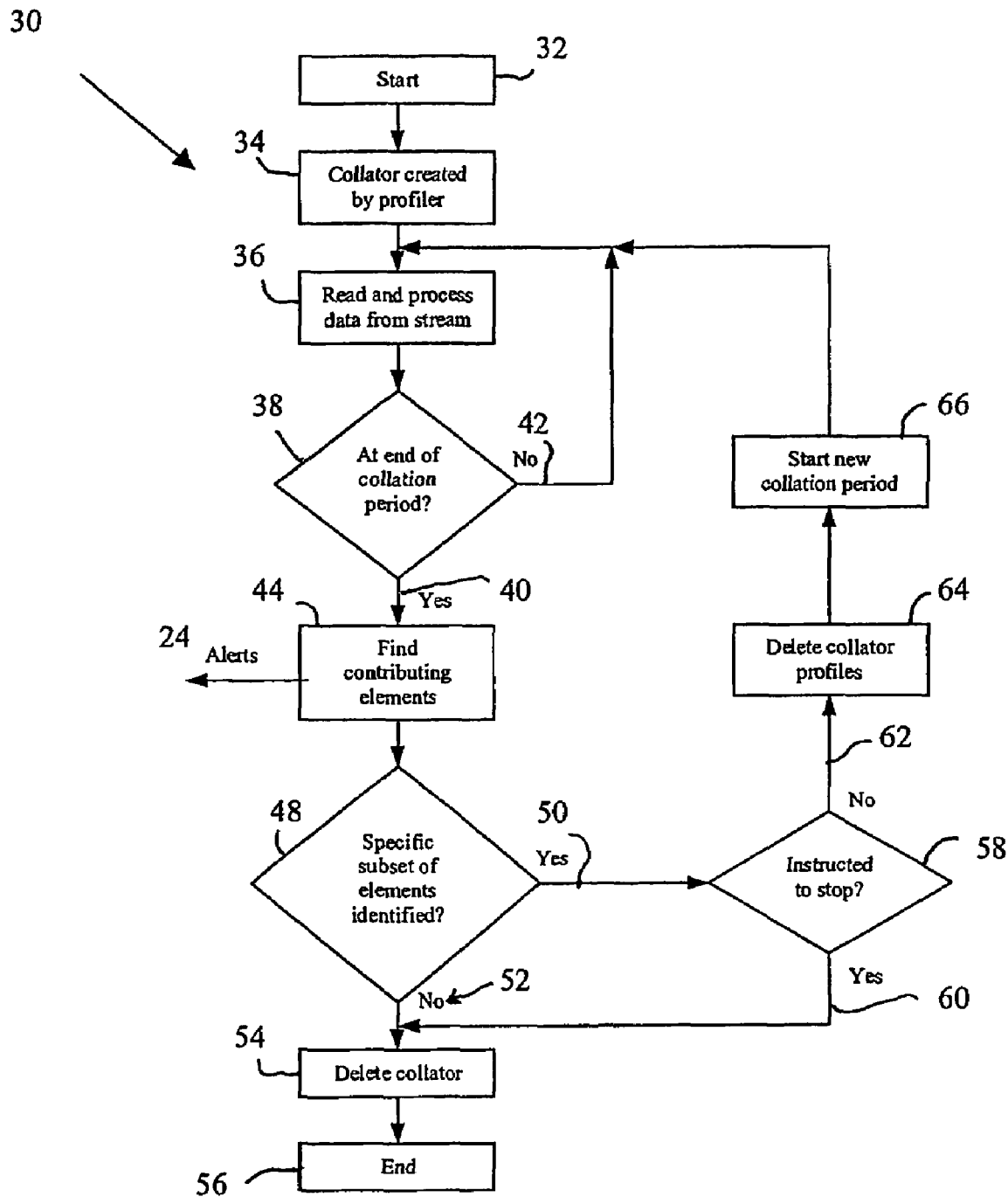
FIG. 2 is a flow chart showing a preferred method of use of the system of FIG. 1.

Referring to FIG. 2 the process 30 conducted by a collation 30 instance is shown. The collator instance starts at 32, then at 34 the profiler 14 determines from a comparison of each accumulated value with the collation thresholds that the corresponding collation threshold has been reached. At 36 the collation instance reads and processes data from the stream 12. The collator then senses at 38 whether the collation instance is at the end of the collation period. If it is not, as indicated by 42, it again repeats the reading and processing of data from the stream returning to 36. At the end of the collation period (indicated by 40), the collation instance at 44 finds the extreme value network elements and issues alerts 24 to the alert investigation team. The collation instance then determines whether a specific subset of network elements has been identified at 48. If not (indicated by 52), the process proceeds to delete, at 54, the collation instance and then ends at 56. If a specific subset of elements has been identified (indicated by 50), the collation instance 16 then checks whether it has been instructed to stop at 58. If it has been instructed to stop (indicated by 60), it proceeds to the delete collation instance step at 54. If it has not been instructed to stop (indicated by 62), it proceeds to delete the collation profile, at 64. It then starts a collation profile over a new collation period, at 66, and returns to the read and process step at 36.

An example of how the system would be applied and practised is now described. Consider the values given in Table 1 where two profilers monitor the cost of calls to two ranges of telephone numbers. Such a system would be used to detect certain types of telecommunications fraud that are characterised by large numbers of high cost calls to a small set of destination numbers.

TABLE 1

| Profile Number | Minimum value of range | Maximum value of range | Profile value[1] | Median of previous 14 profiles[2] | Collation threshold |
|---|---|---|---|---|---|
| Profile 1 | 112000000 | 119999999 | 863124 | 713624 | 3568120 |
| Profile 2 | 820000000 | 839999999 | 82816 | 14990 | 74950 |

[1]Profile value at end of $n^{th}$ profiling period
[2]Median of the $(n-15)^{th}$ to $(n-1)^{th}$ profile values The first profiler accumulates the cost of calls to numbers between 112000000 and 119999999 over the profiling period, and the second, to numbers between 820000000 and 839999999. Since call cost is usually explicitly represented in the data streams provided by telecommunications networks, the profilers need apply no function to the call cost information before accumulating it. Assume that the profiling period is chosen to be 24 hours (so that the profilers represent the total costs of calls to numbers in the profilers' ranges over 24 hour periods) and that the number of previous profiles from which the collation threshold is derived is 14 (so that the collation threshold is based on the values of the profiles for the preceding two weeks). The median function will be used to extract the collation threshold from those 14 profiles, because the median of the profiles is largely unaffected by profiles that have particularly large or small values, reducing the risk that meaningless alerts are generated by normal fluctuations.

Assuming that the values of the previous 14 profiles are such that their medians are as given in Table 1 and that the collation sensitivity is 5.0, the collation thresholds of each profile can be calculated to be 3,568,120 and 74,950 for profiles 1 and 2 respectively. (These figures are calculated by taking the product of the value of the collation sensitivity and the medians of the profile values calculated for the last 14 days). Since the profile value in the first profile is less than the profiler's collation threshold, no collation is triggered for the range 112000000 and 119999999. The profile value for the second profile is greater than its collation threshold, and thus the collator creates a collation instance to analyse all calls to numbers in the range that the second profiler monitors—that is, all calls to numbers between 820000000 and 839999999. The profiles are then reset to zero and the next profiling period begins as normal—even if a profile has a collation instance associated with it.

To illustrate the behavior of a collation instance, assume that the collation period is set to 24 hours, and that the collation function is the same as the profiler function—i.e. the collator accumulates the costs of calls to numbers in its range over 24 hour periods. Assuming that only the calls listed in Table 2 are made within the first collation period, the sorted collation profiles at the end of that period are given in Table 3. Only four collation profiles are created because only four different numbers were called within the collation period, shown in the ordered list given in Table 3 and of those, only the first profile (shown in italics) would generate an alert. However, for the ordered list given in Table 4, alerts would be generated for the numbers 82847168 and 82785474, because these numbers both satisfy the previously described criterion. If the alerts were found not to indicate fraud, the alert investigation team may choose to instruct the system to adapt. In this case, profiler 2 (which caused the creation of the collator that generated the alerts), would increase its collation sensitivity to the profile value that caused the collation instance to be created—82,816—divided by the median of the values of the profiles for the 14 days before the collator was created—14,990—plus an additional, say, 10 percent headroom, giving approximately 6.077.

TABLE 2

| Called Number | Call Cost |
| --- | --- |
| 82785474 | 45 |
| 82734045 | 65 |
| 83276737 | 89 |
| 82785474 | 864 |

TABLE 2-continued

| Called Number | Call Cost |
| --- | --- |
| 83932483 | 54 |
| 82734045 | 5 |
| 83932483 | 34 |
| 83932483 | 43 |
| 82785474 | 76 |
| 83276737 | 455 |

TABLE 3

| Number | Collator Profiler (Accumulated Cost) |
| --- | --- |
| 82785474 | 985 |
| 83276737 | 441 |
| 83932483 | 131 |
| 82734045 | 70 |

TABLE 4

| Number | Collator Profiler (Accumulated Cost) |
| --- | --- |
| 82847168 | 994 |
| 82785474 | 985 |
| 83276737 | 441 |
| 83932483 | 131 |
| 82734045 | 70 |

Other data characteristics may also be the subject of analysis for extreme behavior, such as call duration, repeated call type (interstate or overseas) or repeated call destination.

It will be appreciated by a person skilled in the art of the present invention that the present invention has applications outside of the telecommunications network fraud detection example described above. It can also be used in other applications where networks are subject to extreme behavior that is desired to be identified. Such an example is the area of fault monitoring of an electrical distribution network where the system can be employed to look for surges in the distribution network.

Modifications and variations may be made to the present invention without departing from the basic inventive concept. Such modifications and variations are intended to fall within the scope of the present invention as described in the foregoing description and appended claims.

The invention claimed is:

1. A method of identifying abnormal behavior in activity occurring over a network comprising a plurality of network elements, each network element having a network element identifier, the method comprising:

maintaining one or more group profiles of network activity, each group profile being associated with a plurality of network element identifiers;

accumulating values of a first function of the contents of an input data stream over a first period of time in each group profile so as to profile the behavior of a respective first portion of the network corresponding to the network element identifiers associated with the respective group profile, the contents of the data stream including at least one field containing a network element identifier and other information related to activity over the respective network element having the respective network element identifier;

comparing the accumulated values of each group profile with a corresponding collation threshold and determining whether each group profile at least reaches the corresponding collation threshold;

creating a plurality of collation profiles for each group profile that reaches the collation threshold, each collation profile being associated with one or more network element identifiers from the plurality of network element identifiers corresponding to the group profile that caused the creation of the corresponding collation profiles;

accumulating values of a second function of the contents of the input data stream in each collation profile over a second period of time so as to profile behavior of a respective second portion of the network corresponding to one or more of the network element identifiers associated with the respective collation profile; and identifying abnormal behavior in activity over each second portion of the network by checking whether each of the accumulated values of the collation profiles meets an abnormal behavior criterion.

2. A method according to claim 1, wherein each collation threshold is calculated as a configurable function of a configurable number of previous group profiles for the corresponding plurality of network element identifiers.

3. A method according to claim 1, wherein each group profile is for a contiguous range of network element identifiers.

4. A method according to claim 1, wherein a collation profile is created for each of the network element identifiers associated with the group profile that reached the collation threshold.

5. A method according to claim 1, wherein a collation profile is created for a plurality of sub-groups of network element identifiers associated with the group profile that reached the collation threshold.

6. A method according to claim 1, wherein the first function does not modify the data in the data stream.

7. A method according to claim 1, wherein the first function is a fraud risk assessment function.

8. A method according to claim 1, wherein the second function is the same as the first function.

9. A method according to claim 1, wherein the second function is a fraud risk assessment function.

10. A method according to claim 1, wherein the first period of time is longer than the second period of time.

11. A method according to claim 1, wherein the first period of time is an integer multiple of the second period of time.

12. A method according to claim 1, wherein the collation profiles are sorted into descending order at the end of the second period.

13. A method according to claim 12, wherein abnormal behavior of the network is identified from the sorted list of collation profiles.

14. A method according to claim 13, wherein abnormal behavior is identified by looking for the first pair of contiguous collation profiles with a difference between them that is larger than the value of the smaller of the two contiguous collation profiles.

15. A method according to claim 14, wherein an alert is created for the collation profiles which are identified as reflecting abnormal behavior.

16. A method according to claim 1, wherein each collation instance is deleted at the end of the second period and wherein new collation profiles are created for group profiles that reach the corresponding collation threshold.

17. A method according to claim 1, wherein if a collation profile does not identify abnormal behavior at the end of the second period of time an alert is generated.

18. A method according to claim 15, wherein when an alert is generated, that upon investigation turns out not to be created by abnormal behavior, the collation threshold of the group profile corresponding to the collation instance that generated the alert is adjusted by a configurable amount so as to be less sensitive.

19. A method according to claim 1, wherein the collation threshold is temporarily adjusted to take into account known abnormal periods.

20. A method according to claim 1, wherein the corresponding network element identifiers of specific network elements that are expected to have erratic activity are excluded from the group profiles.

21. A system for identifying abnormal behavior in activity occurring over a network comprising a plurality of elements, each network element having a network element identifier, the system comprising:

a profiler arranged to maintain a plurality of group profiles of network activity, each group profile being associated with a plurality of network element identifiers and comprising accumulated values of a first function of the contents of an input data stream over a first period of time so as to profile behavior of a respective first portion of the network corresponding to network element identifiers associated with the respective group profile, the input data stream comprising at least one field which contains a network element identifier and other information related to activity over the respective network elements having the respective network element identifier, wherein the profiler is configured to compare the accumulated values of each group profile with a corresponding collation threshold and determine whether each group profile at least reaches the corresponding collation threshold; and a collator configured to create collation instances, the collator configured to only create a collation instance when the profiler determines from the comparison of each accumulated value with the corresponding collation threshold that the corresponding collation threshold has been reached, the collator being configured such that each collation instance creates a collation profile for one or more network element identifiers from the plurality of network identifiers, each collation profile comprising accumulated values of a second function of the contents of the input data stream over a second configurable period of time so as to profile behavior of a respective second portion of the network corresponding to network element identifiers associated with the respective collation profile, wherein the collator is further configured to identify abnormal behavior by checking whether each of the accumulated values of each collation profile meets an abnormal behavior criterion.

22. The method of claim 1, wherein the other information in the data stream comprises at least one of the following: a call duration, a repeated call type, a repeated call destination, call costs, and an identity of switches used to route a data stream around the network.

23. The system of claim 21, wherein the other information in the data stream comprises at least one of the following: a call duration, a repeated call type, a repeated call destination, and an identity of switches used to route a data stream around the network.

24. A system for identifying abnormal behavior in activity occurring over a network comprising a plurality of network elements, each network element having a network element identifier, the system comprising:

means for maintaining one or more group profiles of network activity, each group profile being associated with a plurality of network element identifiers;

means for accumulating values of a first function of the contents of an input data stream over a first period of time in each group profile so as to profile behavior of a respective first portion of the network corresponding to the network element identifiers associated with the respective group profile, the contents of the data stream including at least one field containing a network element identifier and other information related to the activity over the respective network elements having the respective network element identifier;

means for comparing the accumulated values of each group profile with a corresponding collation threshold and determining whether each group profile at least reaches the corresponding collation threshold;

means for creating a plurality of collation profiles for each group profile that reaches the collation threshold, each collation profile being associated with one or more network element identifiers from the plurality of network element identifiers corresponding to the group profile that caused the creation of the corresponding collation profiles;

means for accumulating values of a second function of the contents of the input data stream in each collation profile over a second period of time so as to profile behavior of a respective second portion of the network corresponding to one or more of the network element identifiers associated with the respective collation profile; and means for identifying abnormal behavior in activity over each second portion of the network by checking whether each of the accumulated values of the collation profiles meets an abnormal behavior criterion.

25. One or more processor readable storage devices having processor readable code embodied on the processor readable storage devices, the processor readable code for programming one or more processors to perform a method of identifying abnormal behavior in activity occurring over a network comprising a plurality of network elements, each network element having a network element identifier, the method comprising:

maintaining one or more group profiles of network activity, each group profile being associated with a plurality of network element identifiers;

accumulating values of a first function of the contents of an input data stream over a first period of time in each group profile so as to profile behavior of a respective first portion of the network corresponding to the network element identifiers associated with the respective group profile, the contents of the data stream including at least one field containing a network element identifier and other information related to activity over the respective network element having the respective network element identifier;

comparing the accumulated values of each group profile with a corresponding collation threshold and determining whether each group profile at least reaches the corresponding collation threshold;

creating a plurality of collation profiles for each group profile that reaches the collation threshold, each collation profile being associated with one or more network element identifiers from the plurality of network element identifiers corresponding to the group profile that caused the creation of the corresponding collation profiles;

accumulating values of a second function of the contents of the input data stream in each collation profile over a second period of time so as to profile behavior of a respective second portion of the network corresponding to one or more of the network element identifiers associated with the respective collation profile; and identifying abnormal behavior in activity over each second portion of the network from by checking whether each of the accumulated values of the collation profiles meets an abnormal behavior criterion.

\* \* \* \* \*

UNITED STATES PATENT AND TRADEMARK OFFICE
CERTIFICATE OF CORRECTION

PATENT NO. : 7,631,355 B2
APPLICATION NO. : 10/965670
DATED : December 8, 2009
INVENTOR(S) : Bolt et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1074 days.

Signed and Sealed this

Second Day of November, 2010

David J. Kappos
*Director of the United States Patent and Trademark Office*